Aug. 7, 1934.　　　　J. H. HOWE　　　　1,969,077
AIRCRAFT SUSTAINING UNIT
Filed May 25, 1932　　2 Sheets-Sheet 1
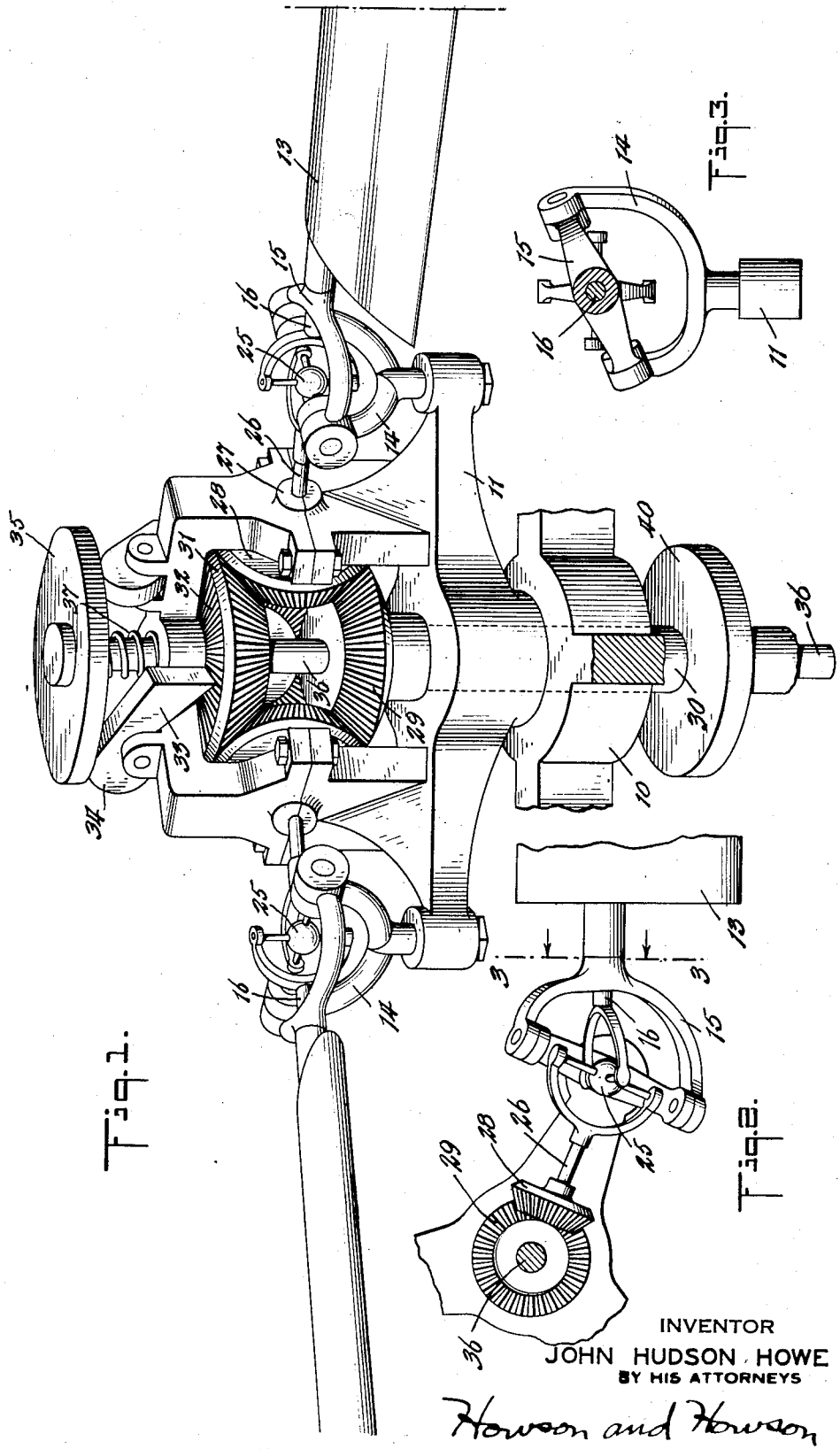
INVENTOR
JOHN HUDSON HOWE
BY HIS ATTORNEYS
Howson and Howson

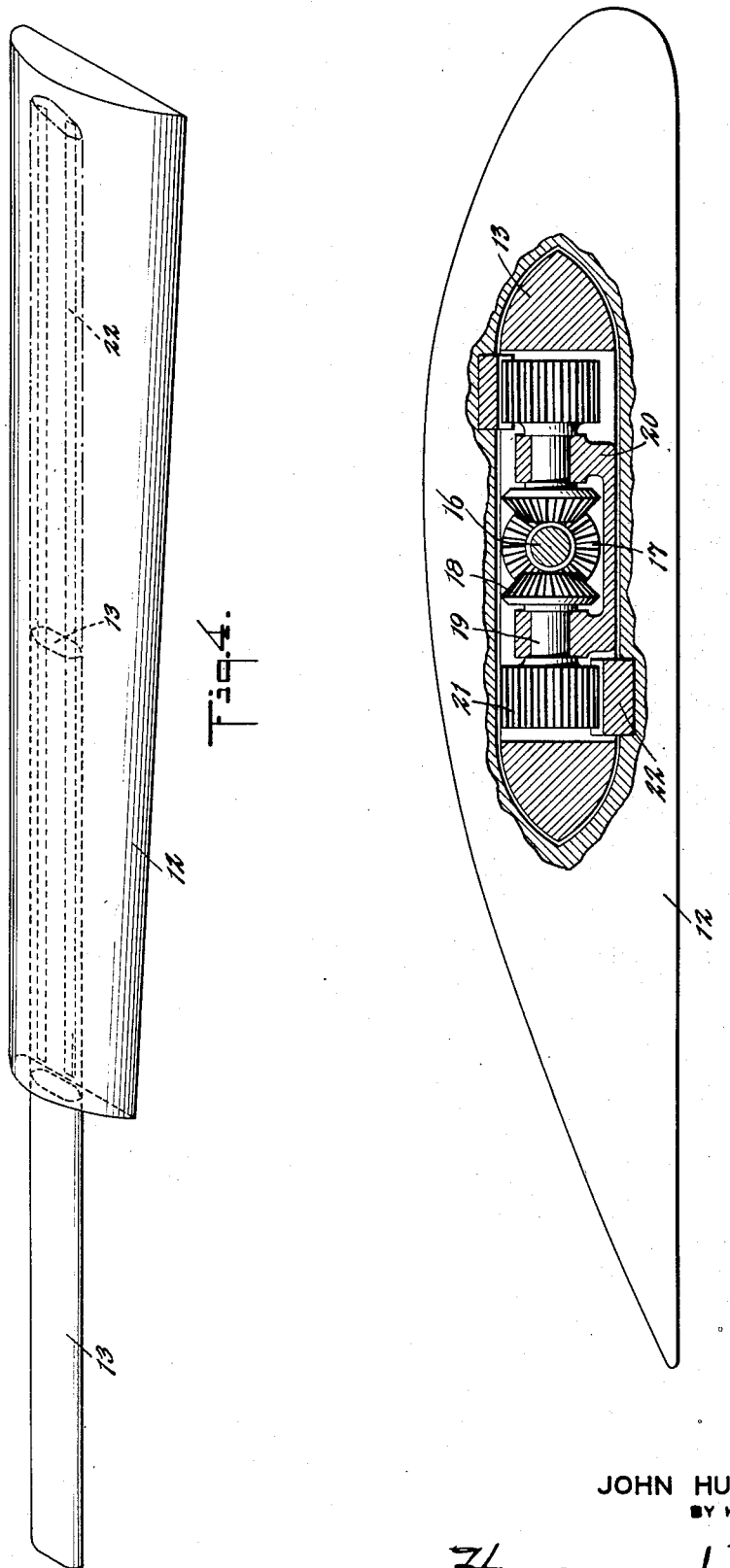

Patented Aug. 7, 1934

1,969,077

UNITED STATES PATENT OFFICE 1,969,077

AIRCRAFT SUSTAINING UNIT

John Hudson Howe, South Orange, N. J.

Application May 25, 1932, Serial No. 613,536

12 Claims. (Cl. 170—164)

This invention relates to aircraft sustaining units of the type which derive their sustaining action from the free rotation of airfoils under the action of relative air flow.

In aircraft equipped with sustaining units of this character, such as the autogyro, a comparatively wide sweep of the airfoils is required for sharply ascending and descending. For rapid flying however, this large sweep is not necessary, but is instead a hindrance, because of the large amount of air resistance to forward speed of the aircraft inherent in this large sweep of the airfoils.

It is therefore the principal object of the present invention to provide a sustaining unit of this character with means for reducing the radius of the sweep of the airfoils while the aircraft is in flight, in order to attain higher forward speeds of the aircraft, while retaining a sufficient sweep of the airfoils for sustaining purposes.

Other objects are to improve the construction of devices of this character, to render the same more flexible in operation, convenient to use, and otherwise better adapted for the purposes set forth, as will be apparent as the following description proceeds, reference being had to the accompanying drawings, in which Figure 1 is a detail perspective view of the central portion of a sustaining device according to the preferred embodiment of the present invention;

Figure 2 is a partial plan view of the structure shown in Figure 1;

Figure 3 is a section taken along the line 3—3 of Figure 2;

Figure 4 is a perspective view showing an airfoil slidably mounted on its supporting arm; and Figure 5 is an end elevation of the airfoil shown in Figure 4, the central portion thereof being broken away and shown in section to illustrate the means for drawing the airfoil inwardly.

As shown in Figure 1, a bearing structure 10 is provided which is rigidly secured to the body of the aircraft. A hub 11 is rotatably mounted with respect to the bearing structure 10. A plurality of airfoils 12 (Fig. 4) are pivotally mounted with respect to the hub 11. The airfoils 12 being pivoted with respect to the hub 11, and the hub 11 being mounted for free rotation with respect to the operating structure 10, these elements constitute a sustaining unit of the type which derive their sustaining action from the rotation of the airfoils under the action of relative air flow.

According to the present invention, the airfoil 12 is mounted for sliding movement in a direction substantially radial with respect to the hub 11. In the form shown, the airfoil 12 is slidably mounted on an arm 13, the inner end of which is pivoted to the hub 11 as shown in Figures 1, 2 and 3. The hub 11 carries a plurality of hinge members 14, and each arm 13 is provided with a cooperating hinge member 15. As shown in Fig. 3 the hinge member 14 is arranged with the pivotal axis oblique to the plane of rotation, and as shown in Fig. 2 the hinge member 15 is so arranged that the axis of the hinge is oblique to the axis of the arm 13.

For drawing the airfoils 12 inwardly on the arms 13, a shaft 16 extends longitudinally of each arm 13 and is suitably journaled therein. Means actuated by the shaft 16 are mounted in the airfoil 12 for causing the desired longitudinal movement. In the form shown, the shaft 16 carries a beveled gear 17 which meshes with bevel pinions 18 on cross shafts 19 journaled in a bearing member 20 rigidly mounted in the arm 13. The outer ends of the shafts 19 carry spur gears 21 meshing with racks 22 rigidly secured to the inside of the airfoils 12.

As shown in Figs. 1, 2 and 3, each shaft 16 extends inwardly through the hinge member 15 and is connected by a universal joint 25 to a shaft 26 journaled in a bearing 27 carried by the hub 11. The inner end of each shaft 26 carries a beveled gear 28 meshing with a bevel gear 29 keyed on a hollow shaft 30, journaled in the center of the hub 11 and extending downwardly therefrom.

Also meshing with the bevel gears 28 is a bevel gear 31 a portion of which constitutes a ratchet wheel 32, cooperating with which are pawls 33 pivotally mounted in extensions of the bearings 27. The heels 34 of these pawls extend upwardly, and are adapted to be engaged by a releasing disk 35 carried by a rod 36 which extends down through the gears 31 and 29, the hub 11 and the bearing structure 10, and inside the hollow shaft 30. A helical spring 37 coiled about the rod 36 normally holds the disk 35 in its uppermost position. The shaft 30 is provided with a brake 40, which may be applied to hold this shaft stationary while the hub 11 is rotating.

In operation, the aircraft on which this sustaining device is mounted, is moved forward under the action of its propeller, as is customary in the take-off of aircraft of this type. The forward motion results in air currents, which engage the airfoils 12, and thereby cause rotation of the sustaining unit with respect to the bearing structure 10. This rotation of the airfoils with respect to the air flow results in a lifting force, and also a centrifugal force, and the pivotal mounting of the arms on the hub as described permits the airfoils to take a position in which these forces tend to equilibrium.

After take-off, the sustaining device continues its rotation, but the aircraft having attained altitude does not require all of the lifting force available by such rotation, and at the same time the sustaining device offers considerable resistance to forward speed of the aircraft.

In order to increase the forward speed of the aircraft, the operator may apply the brake 40 to hold the shaft 30 and the gear 29 stationary while the hub 11 continues rotation. This action will cause simultaneous rotation of the gears 28 meshing with the gear 29, and the shaft 26 through the universal joints 25, and will rotate the shafts 16 at equal speed. Shafts 16 in turn drive the gears 17 which through the gears 18 and shafts 19 rotate the gears 21. The gears 21 engaging the racks 22 draw the airfoils 12 inwardly.

It should be noted that during the rotation of the sustaining device when the brake 40 has not been applied, the gears 28, 29 and 31 are stationary with respect to the hub 11. When the brake 40 is applied, the gear 29 is held stationary with respect to the bearing structure 10, which results in relative rotation of the gear 29 with respect to the hub 11. The upper gear 31 rotates in the direction of rotation of the hub 11, the ratchet wheel portion 32 merely idling under the pawls 33.

The means for moving the airfoils on their arms as described depends upon the relative rotation of the gear 29 and the hub 11. Obviously this relative rotation may also be accomplished by a power drive of the shaft 30 at a speed different from the speed of rotation of the hub 11.

As soon as the airfoils 12 have been retracted the desired amount, the operator will release the brake 40 and so release the gear 29. At this time the centrifugal force acting on the airfoil 12 would tend to return the airfoil to its extended position, the gear 21 merely idling on the racks 22. However, the pawls 33 prevent this action and hold the airfoils 12 in the desired position of adjustment.

When higher speed is no longer essential the operator may merely pull down on the rod 36 against the action of the spring 37, which causes the disk 35, engaging the heels 34 of the pawls 33 to lift the pawls out of engagement with the ratchet wheel 32. The airfoils are now free to return to their extended positions under the action of centrifugal force.

The brake 40 may be utilized to retard the speed of return of the airfoils to their extended positions, if desired, and suitable stops are provided to limit the outward movement of the airfoils to the desired maximum extended position.

While one embodiment of the invention has been disclosed in detail, the invention is not to be limited to the details disclosed, but instead includes such embodiments of the broad idea as fall within the scope of the appended claims.

I claim:

1. In an aircraft, a hub, arms pivoted to said hub transversely to said hub, airfoils slidably mounted on said arms, and means for causing longitudinal movement of said airfoils on said arms.

2. In an aircraft, a hub, substantially radial arms hinged to said hub, airfoils slidably mounted on said arms, and means including an element in said hub and cooperating members connected to said airfoils for causing longitudinal movement of said airfoils on said arms.

3. In an aircraft, a sustaining unit comprising a hub, arms universally pivoted to said hub, airfoils slidably mounted on said arms, a relatively rotatable shaft in said hub, and means actuated by relative rotation of said shaft for causing longitudinal movement of said airfoils on said arms.

4. In an aircraft, a sustaining unit comprising a hub, radial arms pivoted to said hub, airfoils slidably mounted on said arms, shafts rotatably mounted in said arms, and means in said airfoils actuated by said shafts for sliding said airfoils on said arms.

5. In an aircraft, a sustaining unit comprising a hub, radial arms pivoted to said hub, airfoils slidably mounted on said arms, and means for sliding said airfoils on said arms including a flexible connection associated with the pivot of each of said arms.

6. In an aircraft, a sustaining unit comprising a hub, radial arms transversely pivoted to said hub, airfoils slidably mounted on said arms, means for sliding said airfoils on said arms, and means for locking said means to hold said airfoils in adjusted position with respect to said arms.

7. In an autogyro, a sustaining unit comprising a plurality of airfoils positioned substantially radially about a common axis, means for mounting the airfoils of such character that they may rotate freely about their axis under the action of relative air flow, transverse hinges between said airfoils and said axis and means for drawing said airfoils inwardly to decrease the resistance thereof to forward speed of the aircraft.

8. In an aircraft a sustaining unit comprising a plurality of airfoils positioned substantially radially about a common substantially vertical axis, means for mounting the airfoils of such character that they may rotate freely about their axis under the action of relative air flow, and means permitting them individually to assume during rotation a position of equilibrium under the lift forces and centrifugal forces set up by said air flow, in combination with means for moving said airfoils inward during such rotation.

9. In an autogyro having a sustaining unit comprising a plurality of airfoils positioned substantially radially about a common axis, and means for mounting said airfoils of such a nature that they may rotate freely about their axis under the action of relative air flow, the improvement which comprises means for moving said airfoils inwardly, and means for holding said airfoils in an intermediate position.

10. In an aircraft, a sustaining unit comprising a hub and a plurality of airfoils mounted to rotate freely by virtue of the action of air currents upon them, and articulated joints between the airfoils and hub such that during rotation of the unit each airfoil may assume a position in which the centrifugal force produced by rotation and the lift due to the action of air currents tend toward equilibrium, in combination with means for applying the momentum of rotation to draw said airfoils inwardly against the action of said centrifugal force, said means being flexible at the joints between the airfoils and said hub.

11. In an aircraft, a plurality of airfoils positioned about a common axis, means for mounting said airfoils so constructed and arranged that they may rotate freely about said common axis under the action of relative air flow and for pivoting them about axes oblique to radii from said common axis, in combination with means for drawing said airfoils inwardly toward said common axis.

12. In an aircraft, a plurality of airfoils positioned about a common axis, means for mounting said airfoils including means of such a nature that they rotate freely about said common axis under the action of relative air flow and of such a nature that they pivot about axes oblique to radii from said common axis, in combination with means for drawing said airfoils inwardly toward said common axis, said last mentioned means being flexible at said oblique axes.

JOHN HUDSON HOWE.